(12) United States Patent
Bai et al.

(10) Patent No.: US 6,825,756 B2
(45) Date of Patent: Nov. 30, 2004

(54) AUTOMOTIVE RADAR SYSTEM

(75) Inventors: Jie Bai, Hitachinaka (JP); Hiroshi Kuroda, Hitachi (JP)

(73) Assignees: Hitachi, Ltd., Tokyo (JP); Hitachi Car Engineering Co., Ltd., Hitachinaka (JP)

( * ) Notice: Subject to any disclaimer, the term of this patent is extended or adjusted under 35 U.S.C. 154(b) by 41 days.

(21) Appl. No.: 10/419,793

(22) Filed: Apr. 22, 2003

(65) Prior Publication Data

US 2003/0201878 A1 Oct. 30, 2003

(30) Foreign Application Priority Data

Apr. 24, 2002 (JP) ...................................... 2002-122656

(51) Int. Cl.⁷ ............................ B60Q 1/00; G08G 1/16; B62D 1/24
(52) U.S. Cl. ....................... 340/435; 340/903; 180/167; 180/169; 342/70; 342/71; 701/301
(58) Field of Search ................................ 340/903, 961, 340/435, 436; 180/167, 169, 271; 701/301; 342/70, 71, 72, 43

(56) References Cited

U.S. PATENT DOCUMENTS

| | | | |
|---|---|---|---|
| 5,479,173 A | * 12/1995 | Yoshioka et al. | 342/70 |
| 5,572,428 A | * 11/1996 | Ishida et al. | 701/301 |
| 5,793,325 A | * 8/1998 | Yamada | 342/70 |
| 5,929,802 A | * 7/1999 | Russell et al. | 342/70 |
| 6,021,375 A | 2/2000 | Urai et al. | 701/301 |
| 6,026,347 A | 2/2000 | Schuster | 701/301 |
| 6,107,956 A | * 8/2000 | Russell et al. | 342/70 |
| 6,157,892 A | 12/2000 | Hada et al. | 701/301 |

FOREIGN PATENT DOCUMENTS

| | | |
|---|---|---|
| JP | 2001-141812 | 11/1999 |
| JP | 2001-242242 | 2/2000 |
| JP | 2001-124848 | 5/2001 |
| WO | WO 02/080810 A | 7/2001 |

* cited by examiner

*Primary Examiner*—Donnie L. Crosland
(74) *Attorney, Agent, or Firm*—Crowell & Moring LLP

(57) ABSTRACT

The invention provides a radar system, which can increase a crossrange detection speed in the lane change state by employing a steering angle sensor, etc. loaded on a vehicle without providing additional hardware. A lane-change determining unit receives a yaw rate response from a steering angle sensor, etc., and determines whether the radar-loaded vehicle is in the steering operation for lane change. If the radar-loaded vehicle is in the lane change state, a gain setting unit shifts a tracker gain to a larger value than that in ordinary running, and calculates a range, a crossrange, a relative velocity, etc. relative to a target from the results of tracker processing executed by a filtering unit. By using the calculated range, crossrange, relative velocity, etc., a control determining unit determines whether there is a collision risk, and whether steering operation to avoid a collision is required. If there is a collision risk, a forward collision warning and a control signal for actuating automatic braking are issued. If automatic steering to avoid a collision is required, an automatic steering control signal is issued. When the lane change state is completed, the radar system is returned to the state employing a tracker gain for the ordinary running.

11 Claims, 12 Drawing Sheets

FIG.1
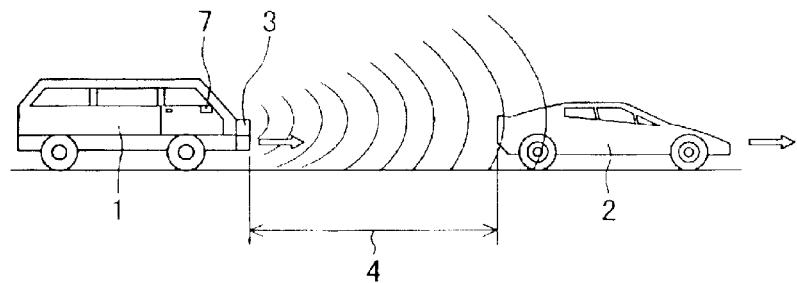
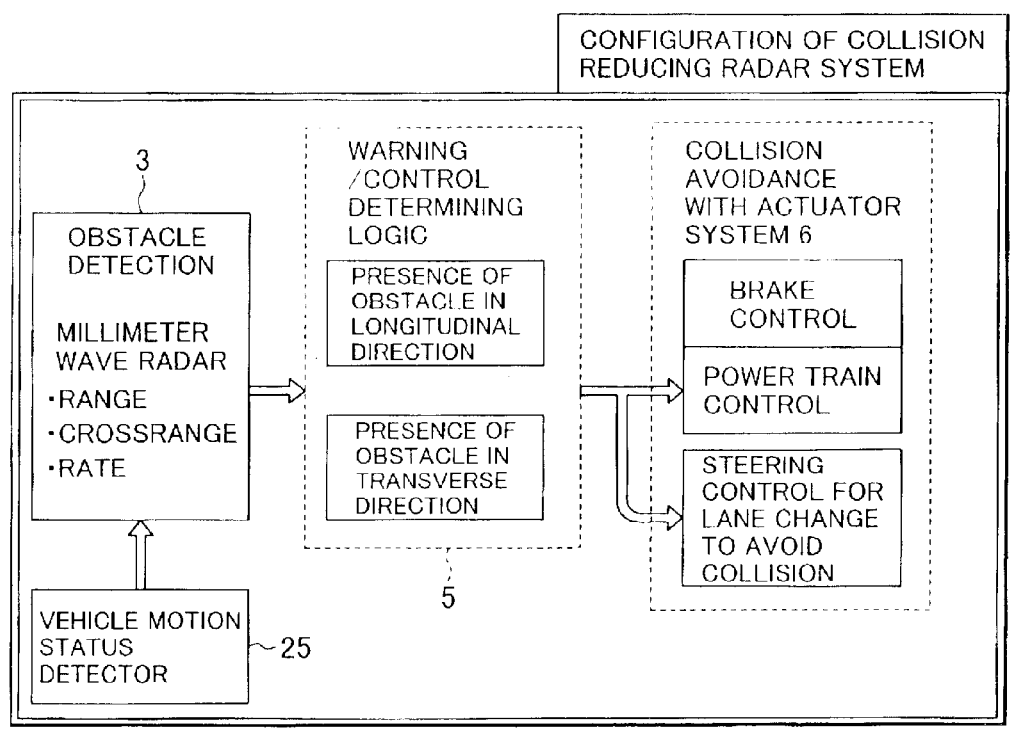

FIG.4
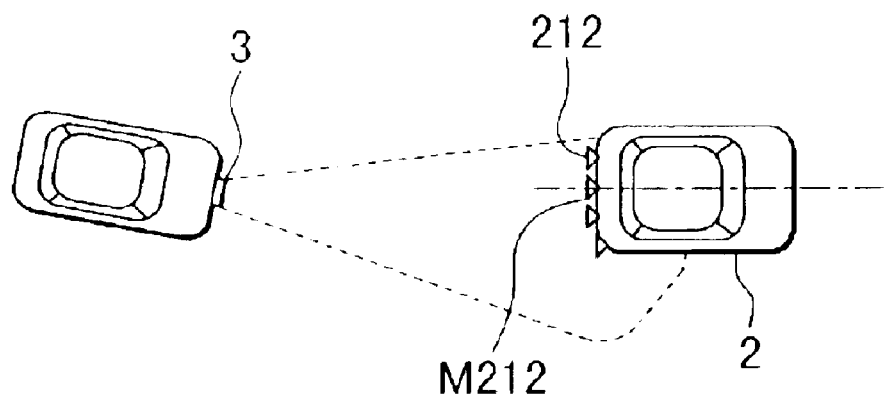
WITH FURTHER STEERING
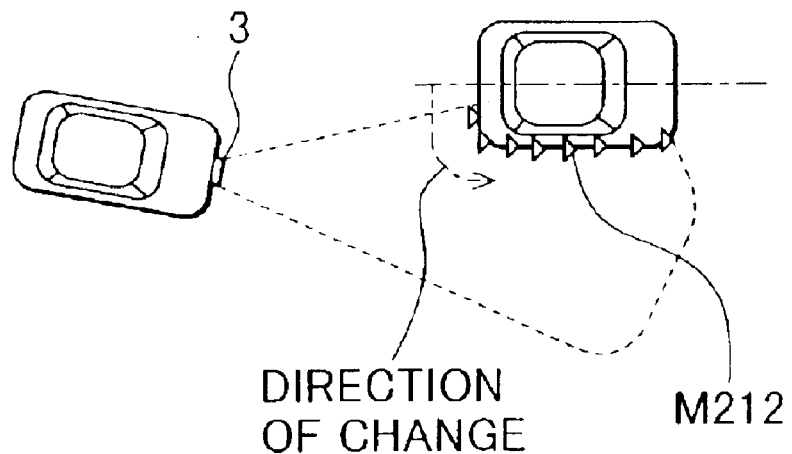

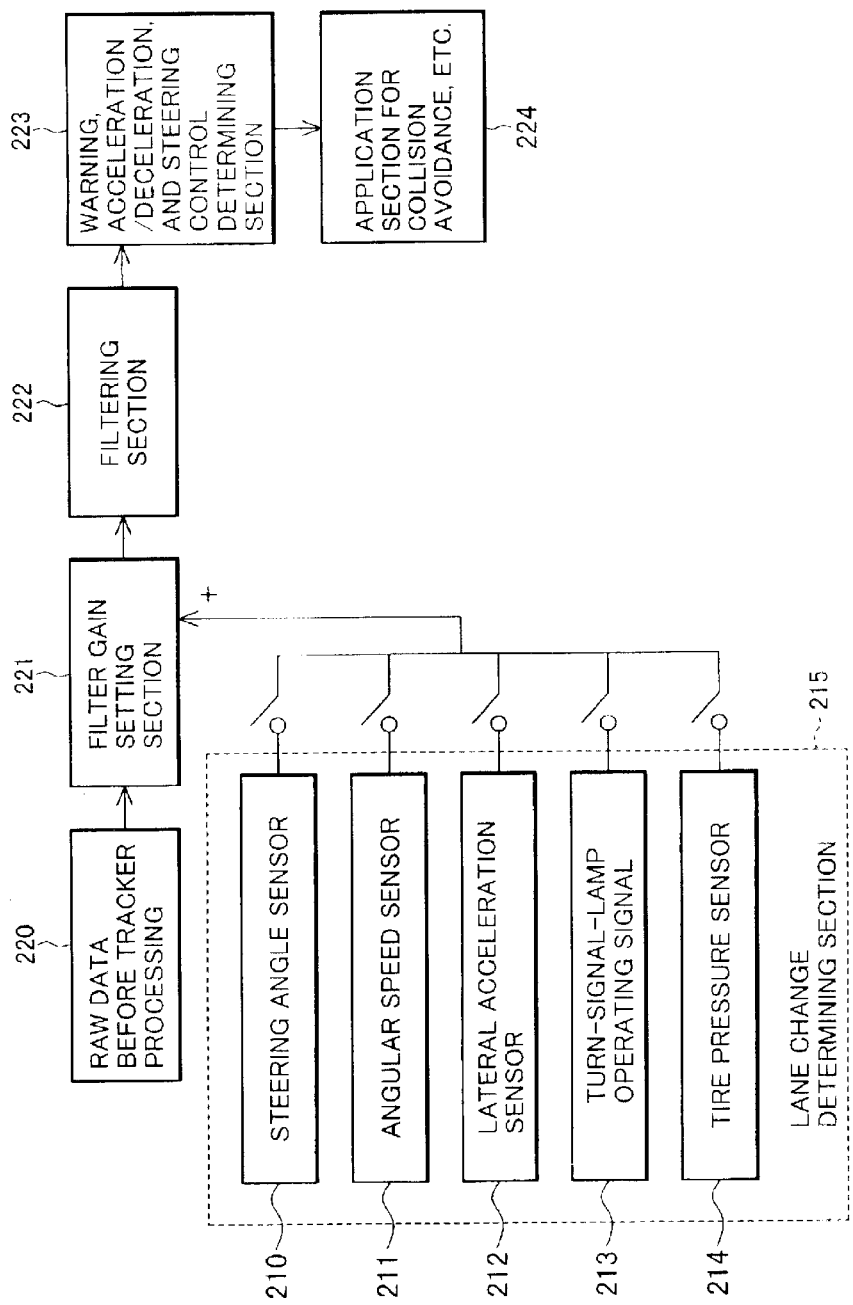

AUTOMOTIVE RADAR SYSTEM

BACKGROUND OF THE INVENTION

1. Field of the Invention

The present invention relates to an automotive radar system, and more particularly to an automotive radar system suitable for use in systems for Adaptive Cruise Control (ACC), Forward Collision Warning System(FCWS), and Automotive Braking for Reduction of Collision Speed.

2. Description of the Related Art

As disclosed in Japanese Publication of Unexamined Patent Application No. 11-39586, for example, systems for Adaptive Cruise Control (ACC) and Forward Collision Warning (FCW) are intended to not only perform follow-up running while automatically adjusting a vehicle speed so that the vehicle distance between a preset target and a radar-loaded vehicle, but also to issue a warning.

Also, an automatic lane change system to avoid a collision against an obstacle is intended to keep a harmonic balance between automatic control and steering operation of the driver as disclosed in Japanese Publication of Unexamined Patent Application No. 2000-142281, for example.

Further, as disclosed in Japanese Publication of Unexamined Patent Application No. 2001-80491, such an automatic lane change system is implemented as a steering force control system for increasing a gain in yawing moment control to increase the yawing moment depending on a steering angular speed and a steering angular acceleration in the case of urgent lane change.

A radar is employed as a range sensor in the automatic lane change system to avoid a collision and the ACC system described above. As a radar, there is generally employed a laser radar or a millimeter wave radar.

A radar emits a radio beam or a laser light, which is reflected by an object, such as a vehicle or an obstacle, and measures a time required for the beam until coming back to the radar. Based on the measured time, the radar determines the distance up to the object having reflected the beam.

Of the two types of radars, the laser radar using the laser light emits a thin laser beam. To receive the laser light with stable intensity, therefore, it is desired that the target have a reflecting surface serving as a light reflector.

On the other hand, of the two types of radars, the millimeter wave radar using a millimeter wave is able to capture the target with higher stability even in a state of rain or fog as compared with the laser radar, and therefore it is expected as an all-weather sensor.

Regarding the millimeter wave radar, there are known several methods for measuring the distance up to the object and the relative velocity relative to the object.

For example, "Development Trend of Automotive Millimeter Wave Radars", The Institute of Electronics, Information and Communication Engineers, October 1996, pp. 977–981, describes various measuring methods including a 2-Frequency CW (Continuous Wave) method switching over two frequencies from one to the other and an FMCW (Frequency Modulated Continuous Wave) method carrying out triangular modulation on transmission frequency.

In those 2-Frequency CW method and FMCW method, a received signal is subjected to the FFT (Fast Fourier Transform) process, and the distance up to the object and the relative velocity relative to the object are measured from information regarding the frequency, the phase and the amplitude of a peak signal in a frequency spectrum obtained by the FFT process.

SUMMARY OF THE INVENTION

The above-described millimeter wave radar of the related art has various superior advantages, such as being of all-weather type, to the laser radar, but it accompanies with problems given below.

The radio beam emitted from an onboard millimeter wave radar is not a narrow beam unlike a laser beam, and propagates with a certain spread. When radiating the radio beam to a target having a size comparable to that of a passenger automobile, therefore, even if the passenger automobile deviates from the center position of the radio radiation during running because of changes of the radio radiation angle, the radio beam is regarded as being radiated to the passenger automobile. Therefore, a variation is increased in detection of the crossrange, i.e., the distance from an extension of a center axis of the radar-loaded vehicle to the passenger automobile as the target.

To suppress a variation in detection of the crossrange and to improve detection accuracy, a gain of a tracker filter used in a radar output estimating section is usually set to a relatively small value.

However, when changing the lane to avoid a collision against an obstacle, the yaw angle and the crossrange of the radar-loaded vehicle are changed to a large extent. This causes a large phase delay in the radar output at the small gain of the tracker filter, which is usually set.

In the onboard millimeter wave radar, as described above, a millimeter wave is radiated with a certain spread. Accordingly, when the radar-loaded vehicle approaches the target vehicle in a condition in which the crossrange is offset, there occurs a phenomenon that the power intensity of radio waves reflected by a side surface of the target vehicle continues to increase and the center position of the reflected radio waves moves from the center position of the vehicle width toward the vehicle side surface.

For that reason, when a driver changes the lane to avoid a collision against an obstacle, a crossrange response of the detected obstacle causes a phase delay as compared with the behavior of lane change of the radar-loaded vehicle, thus resulting in a phenomenon of detection delay.

Accordingly, it is an object of the present invention to provide a radar system, which can increase a crossrange detection speed in the lane change state by employing responses of sensors loaded on a vehicle, such as a steering angle sensor and a gyro sensor, without providing additional hardware.

To achieve the above object, the present invention is constructed as follows.

(1) In an automotive radar system for detecting at least one of a range, a crossrange, an azimuth and a relative velocity relative to a target, the system comprises a lane-change behavior state detecting unit for detecting whether a radar-loaded vehicle is in a lane-change behavior state; and a detection response speed changing unit for changing a target detection response speed of the radar system to a value larger than that in a running state other than the lane-change behavior state when the lane-change behavior state detecting unit detects that the radar-loaded vehicle is in the lane-change behavior state.

(2) In the automotive radar system set forth in above (1), preferably, the detection response speed changing unit comprises a filtering unit for executing a filtering process with a smoothing effect on at least one of the range, the crossrange, the azimuth and the relative velocity relative to the target, and a filter gain changing unit for increasing a gain of the filtering unit, wherein the target detection response speed is set to a value larger than that set in the running state other than the lane-change behavior state by increasing the gain of the filtering unit.

(3) In above (1), preferably, the lane-change behavior state detecting unit includes at least one of a yaw rate or lateral acceleration sensor, a steering angle sensor, a steering torque sensor, a yaw rate sensor, a tire pressure sensor, and a lateral acceleration sensor, and detects the lane-change behavior state of the radar-loaded vehicle in accordance with an output of the at least one sensor.

(4) In above (1), preferably, the lane-change behavior state detecting unit includes a radar-loaded-vehicle lane determining unit for calculating a status variable given as a second time-derivative status variable representing a change amount of a steering angular speed or a change amount of a yaw rate, and then determining that the radar-loaded vehicle is in the lane-change behavior state, when the calculated status variable exceeds a predetermined level.

(5) In above (1), preferably, the automotive radar system further comprises a radar detected value modifying unit for modifying at least one of the range, the crossrange, the azimuth and the relative velocity relative to the target by using a longitudinal or transverse momentum and/or a speed of the radar-loaded vehicle when the lane-change behavior state detecting unit detects that the radar-loaded vehicle is in the lane-change behavior state.

(6) In above (1), preferably, the automotive radar system further comprises a radar-loaded-vehicle transverse movement detecting unit for detecting a longitudinal momentum, a transverse momentum and/or a speed of the radar-loaded vehicle by using an output of a vehicle speed sensor, an acceleration sensor and/or a steering angle sensor.

(7) In above (1), preferably, a forward collision warning is issued when the crossrange from a center of the radar-loaded vehicle to the target is detected as being less than a predetermined value, and the forward collision warning is automatically stopped when the crossrange from the center of the radar-loaded vehicle to the target is detected as being not less than the predetermined value.

(8) In above (1), preferably, deceleration control with braking is performed when the crossrange from a center of the radar-loaded vehicle to the target is detected as being less than a predetermined value, and the deceleration control with braking is automatically stopped when the crossrange from the center of the radar-loaded vehicle to the target is detected as being not less than the predetermined value.

(9) Also, in an automotive radar system for detecting at least one of a range, a crossrange, an azimuth and a relative velocity relative to a target, the system comprises a lane-change behavior state detecting unit for detecting whether a radar-loaded vehicle is in a lane-change behavior state; and a radar detected value modifying unit for modifying at least one of the range, the crossrange, the azimuth and the relative velocity relative to the target by using a longitudinal and/or transverse momentum or a speed of the radar-loaded vehicle when the lane-change behavior state detecting unit detects that the radar-loaded vehicle is in the lane-change behavior state.

(10) Further, in an automotive radar system for detecting at least one of a range, a crossrange, an azimuth and a relative velocity relative to a target, the system comprises a lane-change behavior state detecting unit for detecting whether a radar-loaded vehicle is in a lane-change behavior state; and a warning stopping unit for issuing a forward collision warning when the crossrange from a center of the radar-loaded vehicle to the target is detected as being less than a predetermined value, and automatically stopping the forward collision warning when the crossrange from the center of the radar-loaded vehicle to the target is detected as being not less than the predetermined value.

(11) Still further, in an automotive radar system for detecting at least one of a range, a crossrange, an azimuth and a relative velocity relative to a target, the system comprises a lane-change behavior state detecting unit for detecting whether a radar-loaded vehicle is in a lane-change behavior state; and a brake deceleration canceling unit for performing deceleration control with braking when the crossrange from a center of the radar-loaded vehicle to the target is detected as being less than a predetermined value, and automatically stopping the deceleration control with braking when the crossrange from the center of the radar-loaded vehicle to the target is detected as being not less than the predetermined value.

When the radar-loaded vehicle changes its lane, a response in detection of the crossrange relative to a forward vehicle is maximized with more importance attached to the detection response than to a variation in the crossrange detection.

Also, the lane change state of the radar-loaded vehicle is determined using the steering angle sensor, the angular speed sensor, a turn signal lamp, etc., which are existing ones.

As a result, a radar system can be realized, which has a faster crossrange detection speed in the lane change state by employing responses of sensors loaded on a vehicle, such as a steering angle sensor and a gyro sensor, without providing additional hardware.

BRIEF DESCRIPTION OF THE DRAWINGS

FIG. 1 is an explanatory view for explaining, as application examples of a millimeter wave radar, Forward Collision Warning and Automatic Lane Change with the radar;

FIG. 4 is an explanatory view showing a situation of radar detection in the lane change state;

FIG. 5 is a block diagram of a filter having a selectable filter gain according to one embodiment of the present invention;

DESCRIPTION OF THE PREFERRED EMBODIMENTS

Figure 2A:
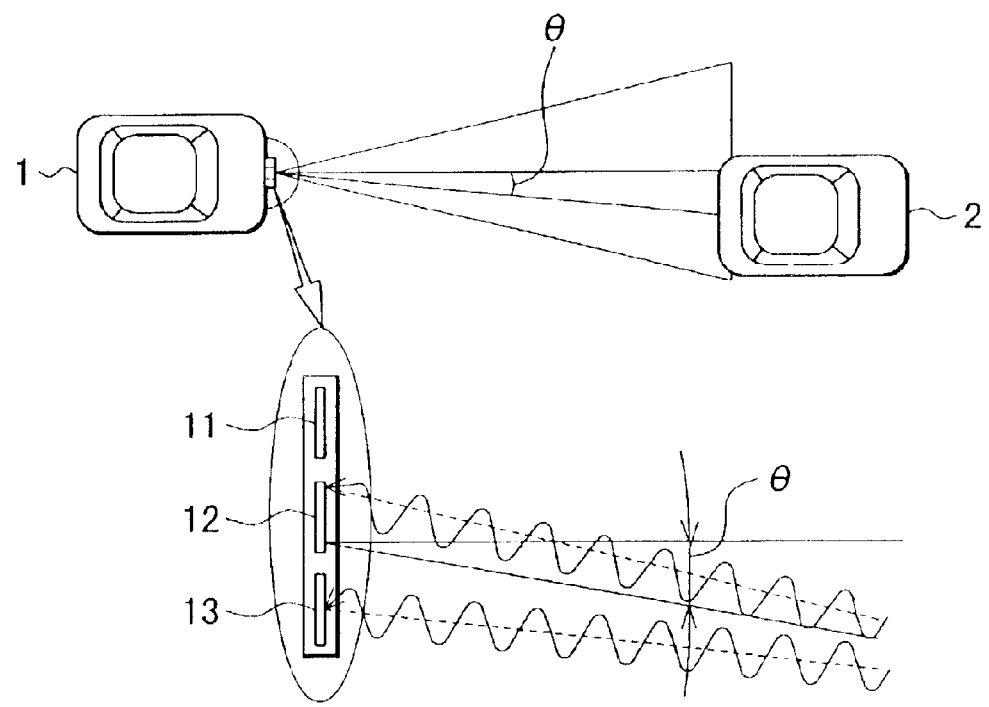
FIGS. 2A and 2B show respectively a general structure of the millimeter wave radar and a signal processing block, which are used in a system for Forward Collision Warning and Automatic Lane Change with the radar.

Preferred embodiments of the present invention will be described in detail with reference to the accompanying drawings.

Summary of functions of Forward Collision Warning and Automatic Lane Change with an onboard radar system according to one embodiment of the present invention will be first described with reference to FIGS. 1 to 5.

FIG. 1 is an explanatory view for explaining, as application examples of a millimeter wave radar, the functions of Forward Collision Warning and Automatic Lane Change with the radar.

Referring to FIG. 1, a millimeter wave radar 3 disposed at the head of a radar-loaded vehicle 1 emits a millimeter wave signal toward a target vehicle 2, and detects a relative velocity, an azimuth and a distance (range) 4 relative to the target vehicle 2. Then, the millimeter wave radar 3 determines the presence of an obstacle and the possibility of collision risk in a lane, in which the radar-loaded vehicle is running, by using a warning/control determining logic 5. When the possibility of collision risk is detected, the millimeter wave radar 3 determines the presence of an obstacle in left and right lanes adjacent to the lane in which the radar-loaded vehicle is running.

Further, acceleration/deceleration control is performed using an actuator system 6 that comprises a brake, a power train, a steering system, etc., whereby the distance 4 relative to the target vehicle 2 is automatically controlled. If there is a collision risk, the issuance of a warning and lane change control to avoid a collision with steering are carried out.

In one embodiment of the present invention, the millimeter wave radar 3 measures the distance, the relative velocity and the azimuth relative to the target vehicle 2. The warning/-control determining logic 5 determines the lane, in which the target vehicle is running, by employing yaw rate information and radar detected data, i.e., the measured distance, relative velocity and azimuth relative to the target vehicle.

When the target vehicle 2 is present on the lane in which the radar-loaded vehicle is running, the logic 5 determines a degree of acceleration/deceleration of the radar-loaded vehicle 1 by employing the measured distance, relative velocity and azimuth, or a preset threshold of the distance relative to the target vehicle.

Also, when the target vehicle 2 is present as an obstacle against running of the radar-loaded vehicle, the logic 5 determines whether there is an obstacle in an adjacent lane to which the radar-loaded vehicle is to move to avoid a collision.

Based on the results of the determinations described above, the acceleration/deceleration control of the actuator system 6 comprising the brake, the power train, the steering system, etc. is performed to automatically adjust the distance 4 relative to the target vehicle 2. When a collision against the target vehicle 2 is unavoidable even with the acceleration/deceleration control, a warning device 7 issues a warning to the driver, or the radar-loaded vehicle is moved to a safe adjacent lane under steering control of the steering system, thereby avoiding the collision.

The millimeter wave radar 3 used for implementing the above-described functions of Forward Collision Warning and Automatic Lane Change with the radar will now be described with reference to FIG. 2.

While there are several methods for detecting the azimuth with the millimeter wave radar, a description is made, by way of example, of a mono-pulse method using two antennas.

FIG. 2A shows an antenna structure of a two-frequency CW radar 3 comprising one transmitting antenna 11, and two (left and right) receiving antennas 12, 13 disposed respectively on the left and right side of the transmitting antenna 11. Also, FIG. 2B shows the configuration of a radar signal processing block.

Figure 2B:
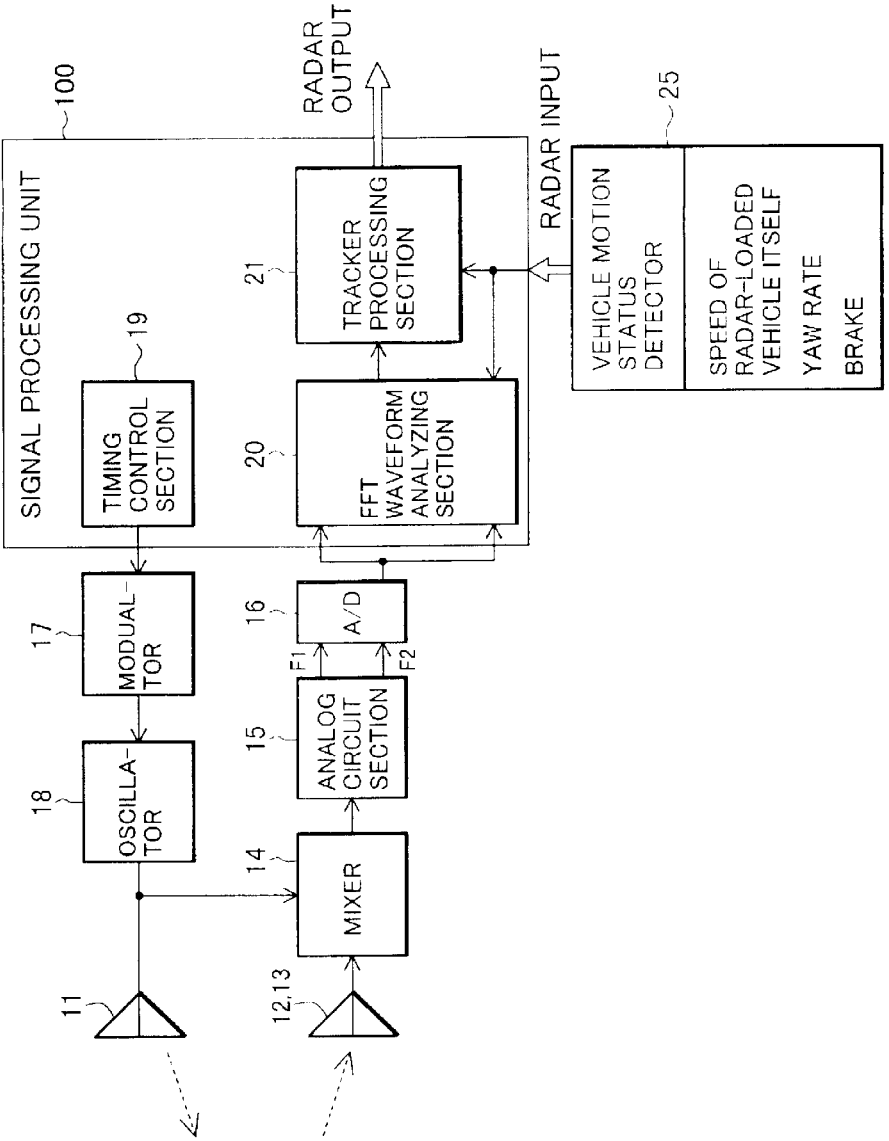

As shown in FIG. 2B, by way of example, the millimeter wave radar 3 comprises a transmitter 18 connected to the transmitting antenna 11 and radiating a radar transmission wave, a modulator 17 for modulating a signal supplied to the transmitter 18, a mixer 14 connected to the receiving antennas 12, 13 and receiving radar waves reflected by the target vehicle, etc., an analog circuit unit 15, an A/D data converter 16, and a signal processing unit 100.

The signal processing unit 100 comprises an FFT waveform analyzing section 20 for processing the received signal with the FFT per time frame and calculating the distance, the relative velocity, the azimuth, etc. relative to the target vehicle based on the radar principles, a timing control section 19 for controlling the operation of each component in the radar system, and a tracker processing section 21 for receiving the detected data from the FFT waveform analyzing section 20 and determining an estimated value after removing measurement noises and variations.

Radar information, such as the speed of the radar-loaded vehicle, the yaw rate, and the status of the brake, from a vehicle motion status detector 25 is inputted to each of the FFT waveform analyzing section 20 and the tracker processing section 21.

Here, the tracker processing section 21 does not directly output, as the detected data, the so-called raw data obtained by the radar measurement, but it implies a filter for performing correction of variations and responses in the measurement, removal of noises, a mathematical smoothing process for filtering the detected data in a certain manner on the time base, and a filtering process for detection and tracking of multiple target vehicles, etc., and then outputting an estimated value reflecting a smooth motion of each target vehicle.

A description is now made of a section of the tracker filter for performing the mathematical smoothing process according to one embodiment of the present invention, which directly affects variations and responses in the measurement.

Figure 3A:
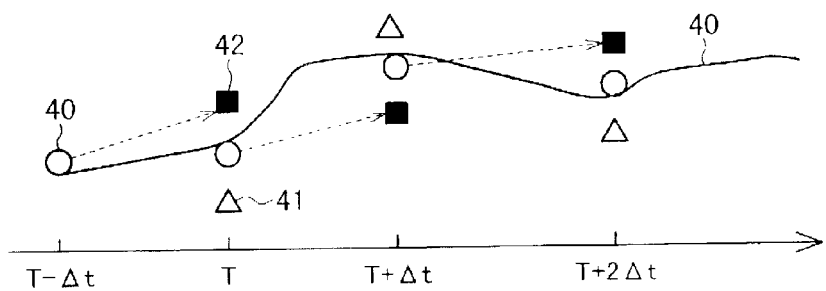
FIGS. 3A and 3B are charts for explaining a filter for smoothing a radar output.

As shown in FIG. 3A, the tracker filter 21 of the millimeter wave radar 3 according to one embodiment of the present invention receives the detected data (each of the distance (range), relative velocity and azimuth (or crossrange=range azimuth) as an observed value 41, predicts a predicted value 42 as a true value from an estimated value 40 in a previous time frame, and determines an estimated value 40 in a current time frame from the predicted value 42 and the actual observed value 41.

In such a way, continuous filter estimated values 40 can be determined using the tracker filter 21. Such a process can be expressed by the following numerical formulae (1) and (2):

(a) Tracker Filter Updating Formula $$r[n]=r[n-1]+K\{rM[n]-rP[n]\} \quad (1)$$

(b) Prediction Equation $$rP[n]=r[n-1]+(\partial rP/\partial t)\Delta t \quad (2)$$

In the above formulae (1) and (2), r is the tracker filter estimated value 40 each of the distance (range), relative velocity and azimuth (or crossrange), rM is the observed value 41 (actually measured value) for each time frame, rP is the predicted value 42, K is a filter gain, and n is the number of time frames. Note that those variables are each expressed as a vector.

Figure 3B:
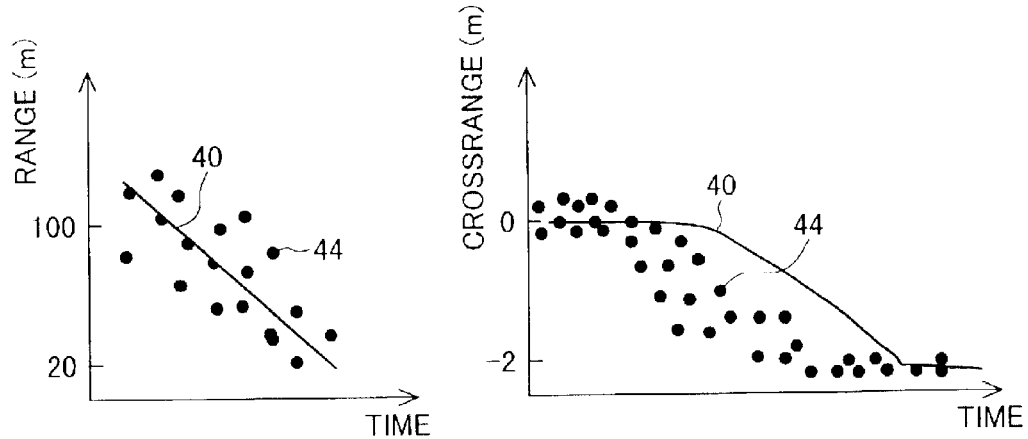

FIG. 3B shows a practical example of the relationship between the filter estimated value 40 and raw detected data 44 not subjected to the filtering.

A left graph of FIG. 3B shows a variation in the detected data 44 regarding the range (i.e., the linear distance between the radar-loaded vehicle and the target vehicle) and corresponding changes of the filter estimated value 40 over time.

Also, a right graph of FIG. 3B shows changes of the detected data 44 and the filter estimated value 40 over time regarding the crossrange (i.e., the linear distance from an extension of a center axis of the radar-loaded vehicle to the target vehicle in a direction horizontally perpendicular to the extension).

In a tracker filter of an onboard radar of the related art, the filter gain K of the above formula (1) is set to a fixed value. Stated otherwise, the constant gain K is set (e.g., a gain value given by a point A shown in FIG. 6B) so that a certain degree of variation is assumed on the premise of a ratio of the measured range value to the true value of variation being constant, and optimum measurement accuracy and optimum response are obtained for the assumed certain degree of variation.

Thus, the related art employs the tracker filter having the constant gain K, which allows a certain phase delay while suppressing the degree of variation, although changes of the crossrange are more quickly and largely increased than in ordinary running, as described above, when the radar-loaded vehicle changes the lane with quick steering operation. Accordingly, the response speed of the tracker filter having the gain K set to a certain fixed value causes a large delay of about 0.7 sec or longer from an actual position change (see delay T2 shown in FIG. 7) with the steering behavior for urgent lane change to avoid a collision or for ordinary lane change.

However, when the lane change is performed steering of the radar-loaded vehicle, the millimeter wave radar 3 determines from the detected crossrange relative to the obstacle whether a forward collision warning is to be continued or stopped. Also, automatic braking and steering control are performed in accordance with the determination as to whether the possibility of a collision is avoided.

Therefore, a response delay in detection of the crossrange causes a warning of an unnecessary warning and a delay in the automatic braking and steering control.

It is thus understood that a response in measuring the crossrange relative to a forward obstacle is an important parameter for early detecting and determining the crossrange relationship between the obstacle and the radar-loaded vehicle.

FIG. 4 is an explanatory view showing a situation of crossrange detection of the forward obstacle with the millimeter wave radar 3 in the lane change state.

In FIG. 4, a crossrange detected position M212 with the millimeter wave radar 3 is defined to provide the crossrange as a transverse distance between a center position of reflection of a radiated radio beam and a central axis of the radiated radio beam.

During the lane change, the direction of radiation of the radio beam radiated from the radar changes to gradually move toward a side surface of the target vehicle 2. With the change of the direction of the beam radiation, therefore, the intensity of the radio beam reflected by the side surface of the target vehicle 2 is gradually increased and the center position of reflection of the radiated radio beam changes in direction coming closer to a longitudinal center of the target vehicle 2.

Such a change of the center position of the radio beam reflection from a transverse center of the target vehicle 2 with the change of an angle of radiation of the radio beam from the radar is thought as being one of factors causing a detection delay T2 (about 0.7 sec) in the related art.

In the present invention, taking into account that, in the measurement by the radar system described above, the amount of change of the raw crossrange data obtained in the case of lane change with automatic steering is increased to a larger extent than in the ordinary follow-up running state and an response speed index of the radar detected result is more important than a variation degree index on that occasion, the response speed and the variation degree are properly set in the ordinary follow-up running state and the lane change state.

The radar response speed is increased as the filter gain increases. If the timing of transition from the ordinary follow-up running state to the quick steering state of the radar-loaded vehicle can be automatically detected, the response in crossrange detection during the lane change can be improved by modifying the tracker filter gain value from the point A to B (see FIG. 6B) to a large extent.

Figure 6A:
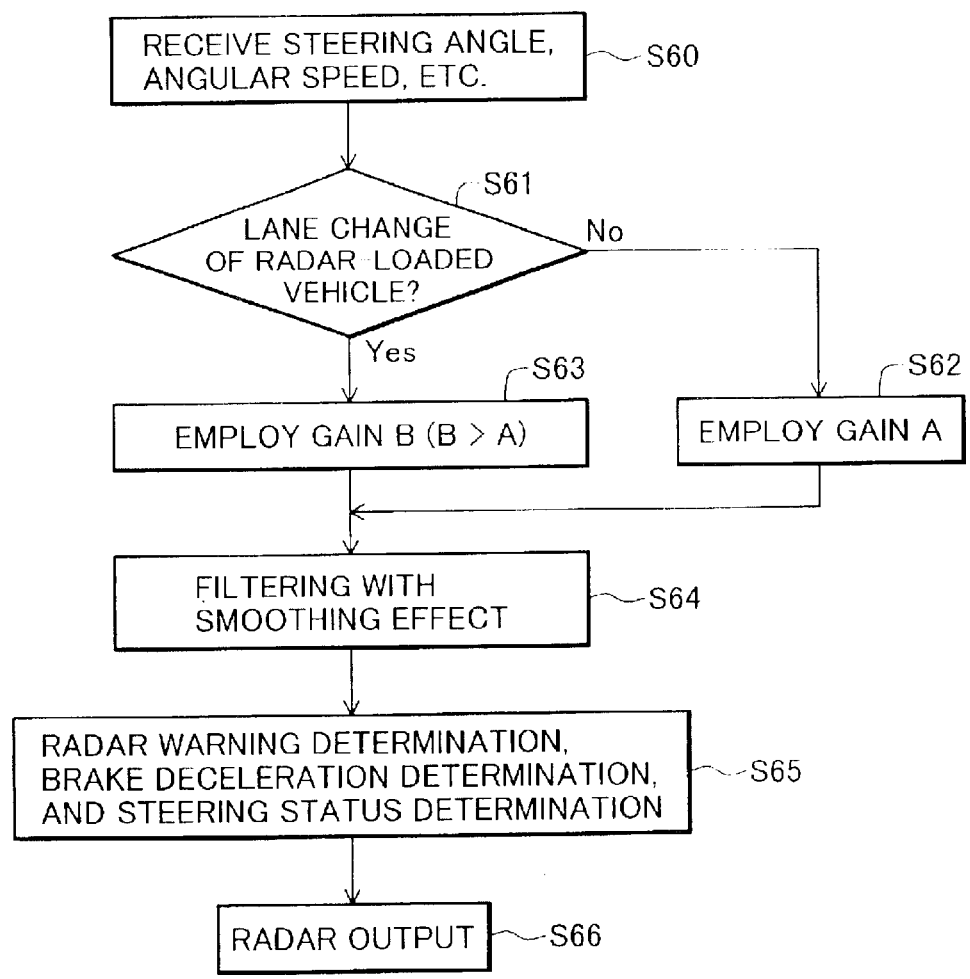
FIG. 6 is a flowchart showing the operation of a radar system according to one embodiment of the present invention.
Figure 6B:
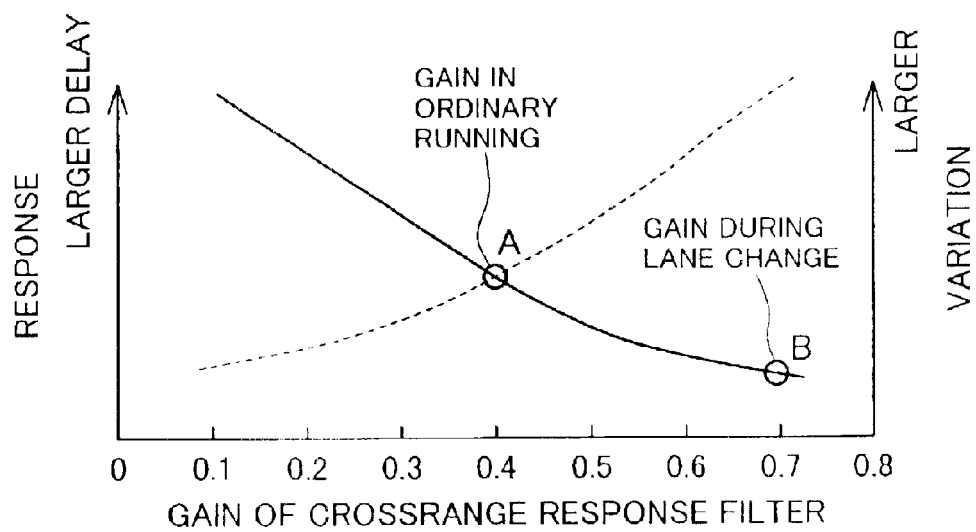

In FIG. 6B, a solid line represents the relationship between the response delay and the gain, and a broken line represents the relationship between the variation in detection of the crossrange and the gain. Referring to FIG. 6B, the tracker filter gain value is set to the point A in the ordinary follow-up running state and to the point B in the lane change state. With such a modification, the variation in detection of the crossrange is increased, but the response is greatly improved.

FIG. 5 is a functional block diagram of a filter gain adjusting section of the filter according to one embodiment of the present invention.

More specifically, the filter gain adjusting section shown in FIG. 5 represents an example for improving the delay in the radar tracker response, and comprises a lane change determining section (lane-change behavior state detecting section) 215 for detecting the lane change state with quick steering based on the steering angle from a steering angle sensor and the yaw rate response from an angular speed sensor, and a filter gain setting section (detection response speed changing section) 221.

Further, the lane change determining section 215 for detecting the lane change state determines the lane change state in accordance with one or a combination of a signal from a steering angle sensor 210, a signal from an angular speed sensor 211, a lateral acceleration response signal from a lateral acceleration sensor 212, a turn-signal-lamp operating signal 213 from a turn signal lamp, and a signal from a tire pressure sensor 214.

During the transition from the ordinary follow-up running state to the quick steering state of the radar-loaded vehicle, the tracker filter gain value may be automatically shifted from the point A to B by the filter gain setting section 221, or it may be changed from the point A to B in an analog manner.

FIG. 6A is a flowchart showing the operation of the filter gain adjusting section shown in FIG. 5.

As shown in FIG. 6A, the lane change determining section 215 first receives the yaw rate response from the sensor section such as the steering angle sensor 210 and the angular speed sensor 211 (step S60). Then, it determines whether the steering operation for the lane change is performed (step S61).

If it is determined in step S61 that the radar-loaded vehicle is during the transition from the ordinary follow-up running state to the lane change state, the control flow proceeds to step S63 in which the tracker filter gain value is shifted from one value at the point A to another value at the point B by the filter gain setting section 221. Then, the control flow proceeds to step S64.

If it is determined in step S61 that the radar-loaded vehicle is not in the lane change state, but it remains in the ordinary follow-up running state, the control flow proceeds to step S62 in which the value at the point A is used as the tracker filter gain value. Then, the control flow proceeds to step S64.

In step S64, the range, the crossrange, the relative velocity, etc. are calculated from the results of tracker processing made on raw data 220 in a filtering section 222 using the gain value set in step S62 or S63.

Subsequently, by employing the range, the crossrange, the relative velocity, etc. calculated in step S64, a control determining section 223 determines in step S65 whether there is a collision risk, whether automatic braking is to be actuated, and whether further steering operation to avoid a collision is required.

Then, in step S66, an application section 224 issues a forward collision warning signal and a control signal for actuating automatic braking if there is a collision risk, and also issues an automatic steering control signal when the automatic steering is required.

When the lane change has completed, the completion of the lane change is determined in step S61 and the filter gain setting section 221 is returned in step S62 to the state employing the gain value at the point A.

FIG. 6B shows, as described above, the relationship between the gain value of the crossrange response filter versus the degree of variation of the laser output and the response delay.

In the ordinary follow-up running, the gain having an intermediate value denoted by the point A is selected in consideration of both the response delay and the degree of variation. Then, in the lane change state, the gain having the best response value denoted by the point B is selected with more importance attached to the response than to the degree of variation.

Figure 7:
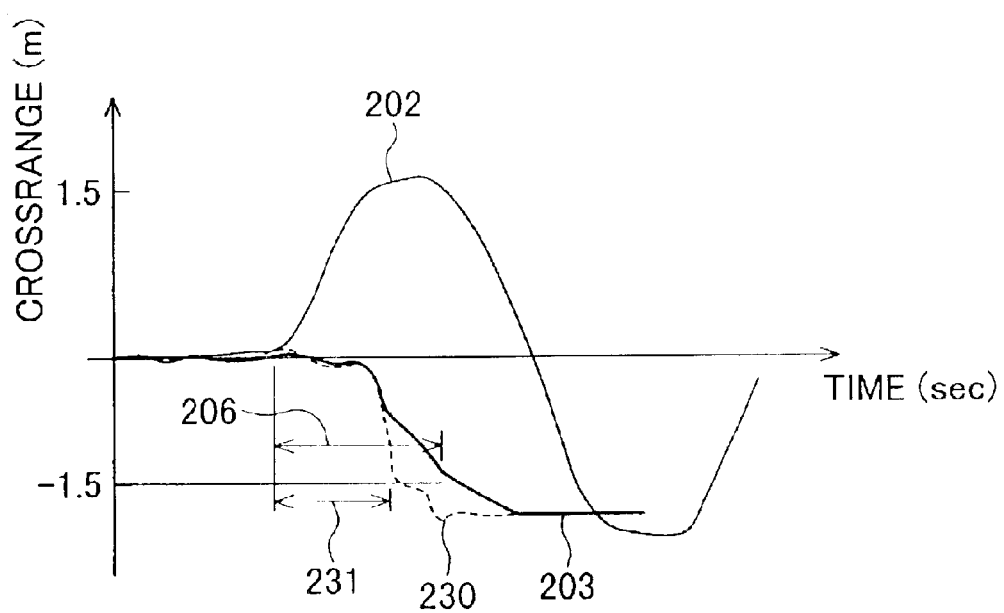
FIG. 7 is a graph showing results of improvement in response according to one embodiment of the present invention.

FIG. 7 is a graph showing an effect of improvement in the response delay resulting from the shift of the filter gain from the value denoted by the point A to the value denoted by the point B shown in FIG. 6B.

As shown in FIG. 7, it is understood that, with the use of the filter gain shifting logic, the crossrange response delay can be greatly improved from about 0.7 sec (delay time T2) in the related art (crossrange 203 indicated by a solid line) to about 0.5 sec (delay time T3) in one embodiment of the present invention (crossrange 230 indicated by a broken line).

Even when the radar-loaded vehicle changes the lane in a condition in which there is no vehicle in the front, the filter gain is changed to the larger value for the purpose of improving the response in the crossrange detection. In such a case, with the filter gain set to the larger value, the response in determination as to whether there is a vehicle in the lane, to which the radar-loaded vehicle is to move, is also improved.

Furthermore, as shown in FIG. 7, it is understood that, comparing with a yaw sensor response 202, the crossrange 230 with the millimeter wave radar after the gain shift has a time delay with an offset on the time base.

The crossrange response delay during the lane change operation can be greatly improved by shifting the filter gain.

To further improve the crossrange response delay, however, the above-mentioned time delay with the offset on the time base must be improved.

A description is now made of an example for improving a time delay component in the response delay of the crossrange 230 with the millimeter wave radar, which is attributable to the offset on the time base.

Figure 8:
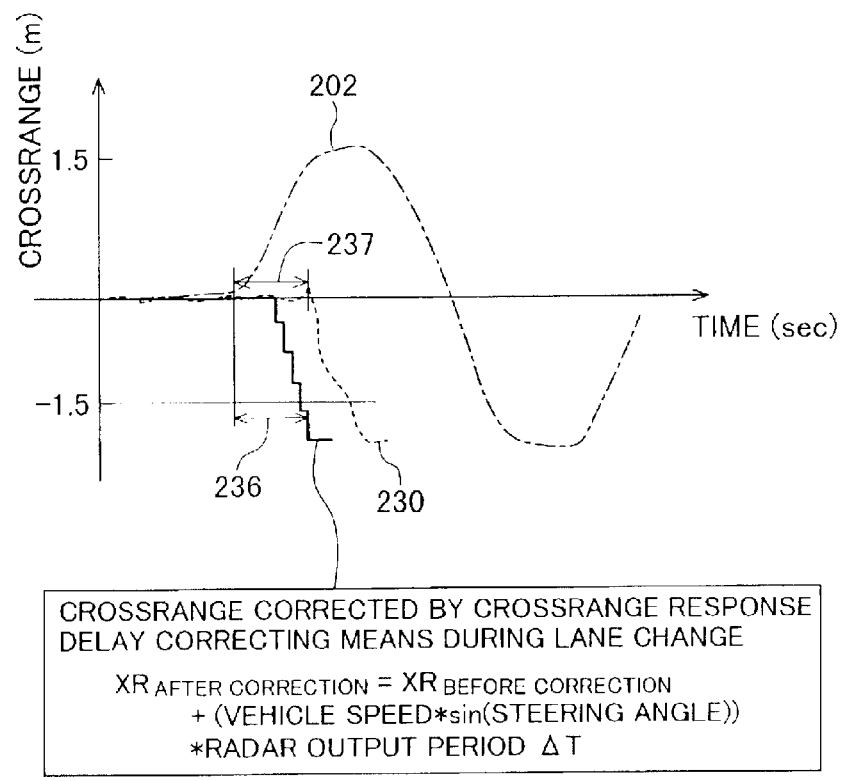
FIG. 8 is a graph showing results of further improvement in response according to one embodiment of the present invention.

FIG. 8 is a graph showing results obtained when the crossrange is further corrected by employing the lateral acceleration of the radar-loaded vehicle in addition to the shift of the filter gain.

As shown in FIG. 4, when during the lane change there is a forward vehicle in the lane in which the radar-loaded vehicle is running before the lane change, the center position of reflection of the radio beam from the radar has a tendency to move toward the lane after the lane change. This tendency is presumably responsible for causing the crossrange 230 with the millimeter wave radar to have the time delay with the offset on the time base in comparison with the yaw angle sensor response 202.

To eliminate that time delay, the radar system further comprises a radar detected value correcting section capable of executing corrective calculation of the crossrange before the tracker processing by using a formula (3) given below:

$$XRA = XRB + (\text{vehicle speed} * \sin(\text{steering angle})) * \Delta T \qquad (3)$$

In the above formula (3), XRA is the crossrange after the correction, XRB is the crossrange before the correction, and $\Delta T$ is the radar output period.

By correcting the crossrange, which is given as the raw data measured by the radar, using the above correction formula (3) and, in addition, shifting the gain of the tracker filter as described above, the crossrange response of the radar output can be further increased.

It is thus understood that, as indicated by a solid line in FIG. 8, a crossrange radar detection delay T4 (236) is about 0.3 sec and the crossrange response delay can be further improved.

Figure 9:
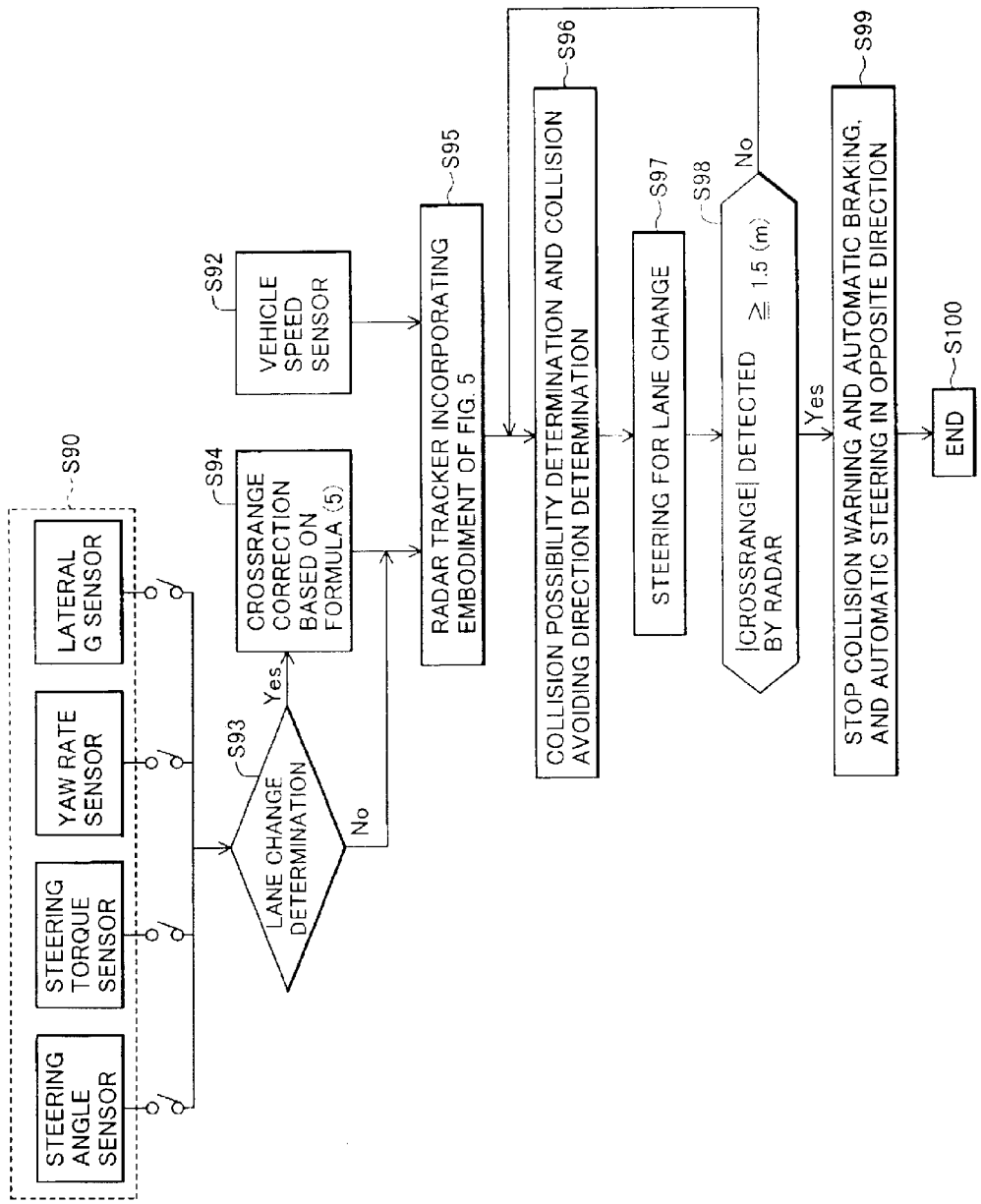
FIG. 9 is a flowchart showing the operation for further improving a response according to one embodiment of the present invention.

FIG. 9 is a flowchart showing the operation in the above-described case of shifting the gain of the tracker filter after correcting the crossrange given as the raw data measured by the radar.

As shown in FIG. 9, outputs of the sensors capable of detecting the vehicle motion status, such as the steering angle sensor and the yaw rate sensor, are first received to detect the vehicle motion status (step S90). It is then determines whether the detected vehicle motion status is in the lane change (step S93).

If it is determined in step S93 that the lane change is detected, the crossrange given as the raw data 220 detected by the millimeter wave radar is corrected using the above formula (3) (step S94). Subsequently, the raw data 220 detected by the millimeter wave radar and corrected in above step is subjected to a smoothing process using the tracker filter having the shifted gain (step S95). In addition, the vehicle speed detected in step S92 is taken in step S95.

On the other hand, if it is determined in step S93 that the lane change is not detected, the control flow skips to step S95 in which the smoothing process is executed.

Then, using the crossrange, the vehicle-to-vehicle distance and the relative velocity detected by the radar, it is determined whether there is a possibility of a collision is determined using the crossrange, and in the event of a collision risk, the direction in which the lane is to be changed to avoid the collision is determined. If the possibility or the risk of a collision is determined, a forward collision warning is issued and automatic braking is operated (step S96). Then, if there is still a collision risk even with the automatic braking actuated while issuing the forward collision warning, the vehicle automatically performs steering for the lane change (step S97).

On that occasion, if the crossrange detected by the radar is 1.5 m or more, it can be determined that there is no collision risk (step S98). Then, the forward collision warning and the deceleration by the automatic braking are stopped (with the provision of a warning stopping section and a brake deceleration canceling section), and the automatic steering system performs steering in the opposite direction, followed by returning to the ordinary straightforward running state (step S99). The control process is thereby brought to an end (step S100).

Thus, the crossrange detection delay can be improved and the fact that the crossrange has increased to a predetermined value or more can be early detected. It is therefore possible to early determine that there is no collision risk if the crossrange is 1.5 m or more, and to stop the forward collision warning and the deceleration by the automatic braking and then perform steering in the opposite direction with the automatic steering system.

Figure 10:
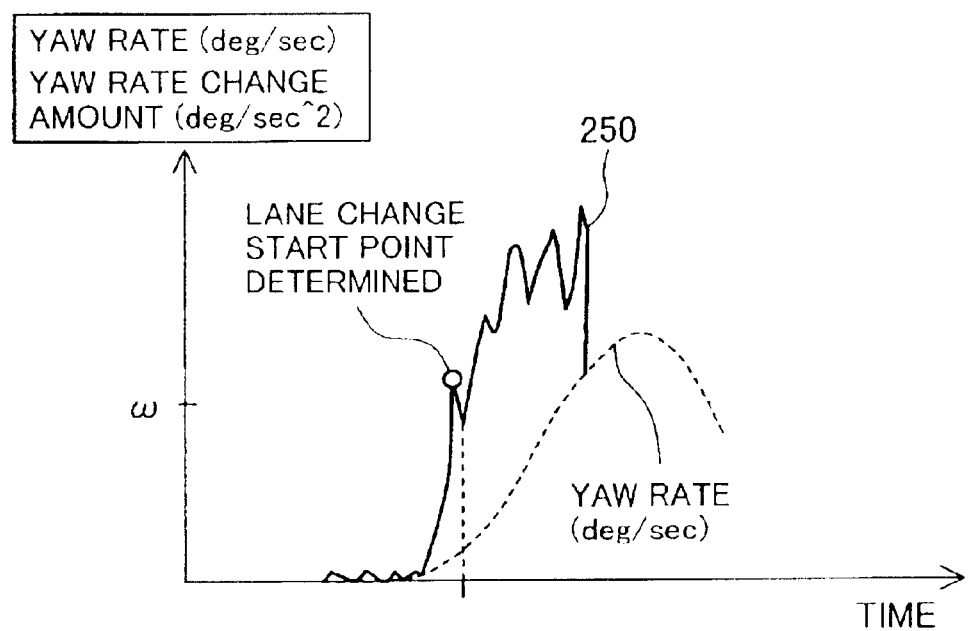
FIG. 10 is a graph showing an example of a second-derivative status variable (change amount of yaw rate) used for determining the lane change operation.

FIG. 10 is a graph showing a status variable given as the change amount of the yaw rate used for determining the lane change operation in the embodiment described above. In the graph of FIG. 10, a broken line represents the yaw rate and a solid line represents the change amount of the yaw rate.

When employing the yaw rate (deg/sec) as the status variable, because the yaw rate provides a large output in ordinary running along a curved road as well, it is not suitably used for determining whether the radar-loaded vehicle is in the lane change state or the ordinary running state along a curved road.

According to one embodiment of the present invention, therefore, the radar system further comprises a radar-loaded-vehicle lane determining section for determining whether the radar-loaded vehicle is in the lane change state by using, as the status variable, the change amount of the yaw rate instead of the yaw rate.

As shown in FIG. 10, when the value of a change amount 250 of the yaw rate as the status variable is not less than 6 [deg/sec$^2$], this is determined as indicating that the vehicle motion status is in transition from the ordinary follow-up running to the lane change.

While the embodiment has been described above as, in the lane change state, setting the filter gain to be larger than that in the ordinary follow-up running state and correcting the crossrange offset, the crossrange response can also be improved by changing only the filter gain to a larger value or by correcting only the crossrange offset without changing the filter gain.

According to the present invention, as described above, a radar system can be realized which has a faster crossrange detection speed in the lane change state by employing responses of sensors loaded on a vehicle, such as a steering angle sensor and a gyro sensor, without providing additional hardware.

What is claimed is:

1. An automotive radar system for detecting at least one of a range, a crossrange, an azimuth and a relative velocity relative to a target, the system comprising:
    lane-change behavior state detecting section for detecting whether a radar-loaded vehicle is in a lane-change behavior state; and
    detection response speed changing section for changing a target detection response speed of the radar system to a value larger than that in a running state other than the lane-change behavior state when said lane-change behavior state detecting section detects that the radar-loaded vehicle is in the lane-change behavior state.

2. An automotive radar system according to claim 1, wherein said detection response speed changing section comprises filtering section for executing a filtering process with a smoothing effect on at least one of the range, the crossrange, the azimuth and the relative velocity relative to said target, and filter gain changing section for increasing a gain of said filtering section, wherein the target detection response speed is set to a value larger than that set in the running state other than the lane-change behavior state by increasing the gain of said filtering section.

3. An automotive radar system according to claim 1, wherein said lane-change behavior state detecting section includes at least one of a yaw rate or lateral acceleration sensor, a steering angle sensor, a steering torque sensor, a yaw rate sensor, a tire pressure sensor, and a lateral acceleration sensor, and detects the lane-change behavior state of the radar-loaded vehicle in accordance with an output of the at least one sensor.

4. An automotive radar system according to claim 1, wherein said lane-change behavior state detecting section includes radar-loaded-vehicle lane determining section for calculating a status variable given as a second time-derivative status variable representing a change amount of a steering angular speed or a change amount of a yaw rate, and then determining that the radar-loaded vehicle is in the lane-change behavior state, when the calculated status variable exceeds a predetermined level.

5. An automotive radar system according to claim 1, further comprising radar detected value modifying section for modifying at least one of the range, the crossrange, the azimuth and the relative velocity relative to said target by using a longitudinal or transverse momentum and/or a speed of the radar-loaded vehicle when said lane-change behavior state detecting section detects that the radar-loaded vehicle is in the lane-change behavior state.

6. An automotive radar system according to claim 1, further comprising radar-loaded-vehicle transverse movement detecting section for detecting a longitudinal momentum, a transverse momentum and/or a speed of the radar-loaded vehicle by using an output of a vehicle speed sensor, an acceleration sensor and/or a steering angle sensor.

7. An automotive radar system according to claim 1, wherein a forward collision warning is issued when the crossrange from a center of the radar-loaded vehicle to said target is detected as being less than a predetermined value, and the forward collision warning is automatically stopped when the crossrange from the center of the radar-loaded vehicle to said target is detected as being not less than the predetermined value.

8. An automotive radar system according to claim 1, wherein deceleration control with braking is performed when the crossrange from a center of the radar-loaded vehicle to said target is detected as being less than a predetermined value, and the deceleration control with braking is automatically stopped when the crossrange from the center of the radar-loaded vehicle to said target is detected as being not less than the predetermined value.

9. An automotive radar system for detecting at least one of a range, a crossrange, an azimuth and a relative velocity relative to a target, the system comprising:
    lane-change behavior state detecting section for detecting whether a radar-loaded vehicle is in a lane-change behavior state; and
    radar detected value modifying section for modifying at least one of the range, the crossrange, the azimuth and the relative velocity relative to said target by using a longitudinal and/or transverse momentum or a speed of the radar-loaded vehicle when said lane-change behavior state detecting section detects that the radar-loaded vehicle is in the lane-change behavior state.

10. An automotive radar system for detecting at least one of a range, a crossrange, an azimuth and a relative velocity relative to a target, the system comprising:

lane-change behavior state detecting section for detecting whether a radar-loaded vehicle is in a lane-change behavior state; and warning stopping section for issuing a forward collision warning when the crossrange from a center of the radar-loaded vehicle to said target is detected as being less than a predetermined value, and automatically stopping the forward collision warning when the crossrange from the center of the radar-loaded vehicle to said target is detected as being not less than the predetermined value.

11. An automotive radar system for detecting at least one of a range, a crossrange, an azimuth and a relative velocity relative to a target, the system comprising:

lane-change behavior state detecting section for detecting whether a radar-loaded vehicle is in a lane-change behavior state; and brake deceleration canceling section for performing deceleration control with braking when the crossrange from a center of the radar-loaded vehicle to said target is detected as being less than a predetermined value, and automatically stopping the deceleration control with braking when the crossrange from the center of the radar-loaded vehicle to said target is detected as being not less than the predetermined value.

* * * * *